L. F. MUSTEE.
HEATING APPARATUS FOR AUTOMOBILES.
APPLICATION FILED MAY 11, 1916.
1,196,384.
Patented Aug. 29, 1916.
3 SHEETS—SHEET 1.
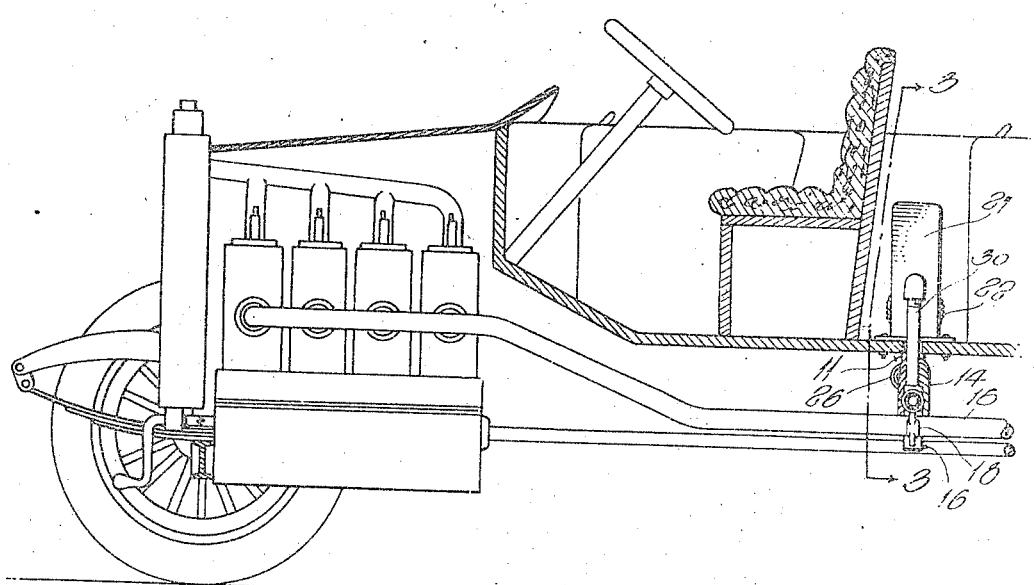
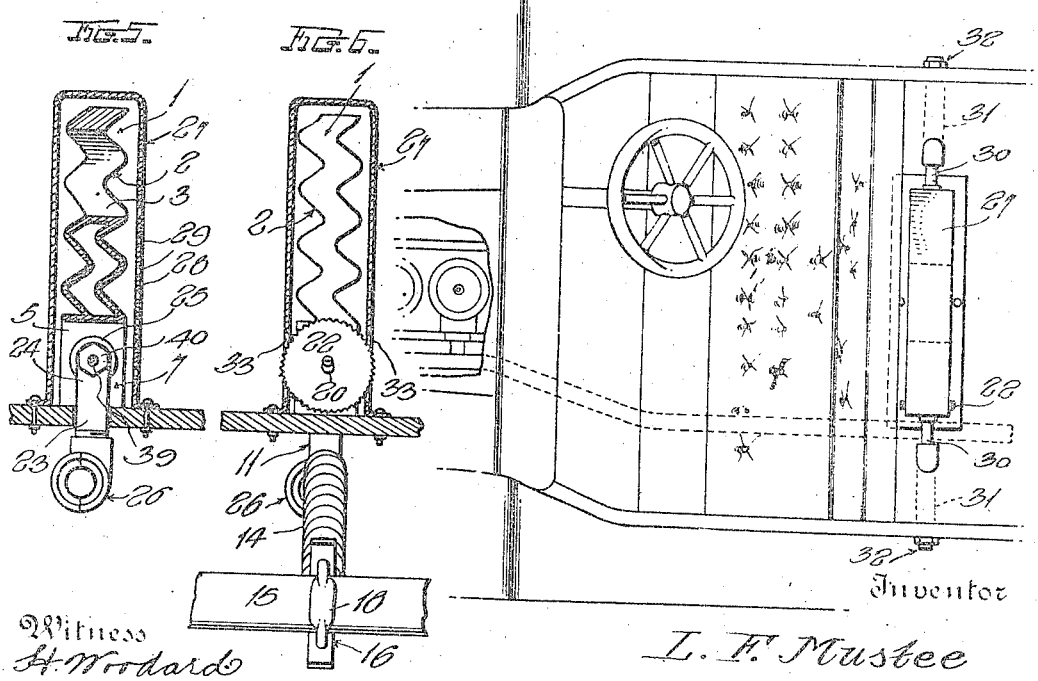
Witness
H. Woodard
Inventor
L. F. Mustee
by H. Williams &c
Attorneys

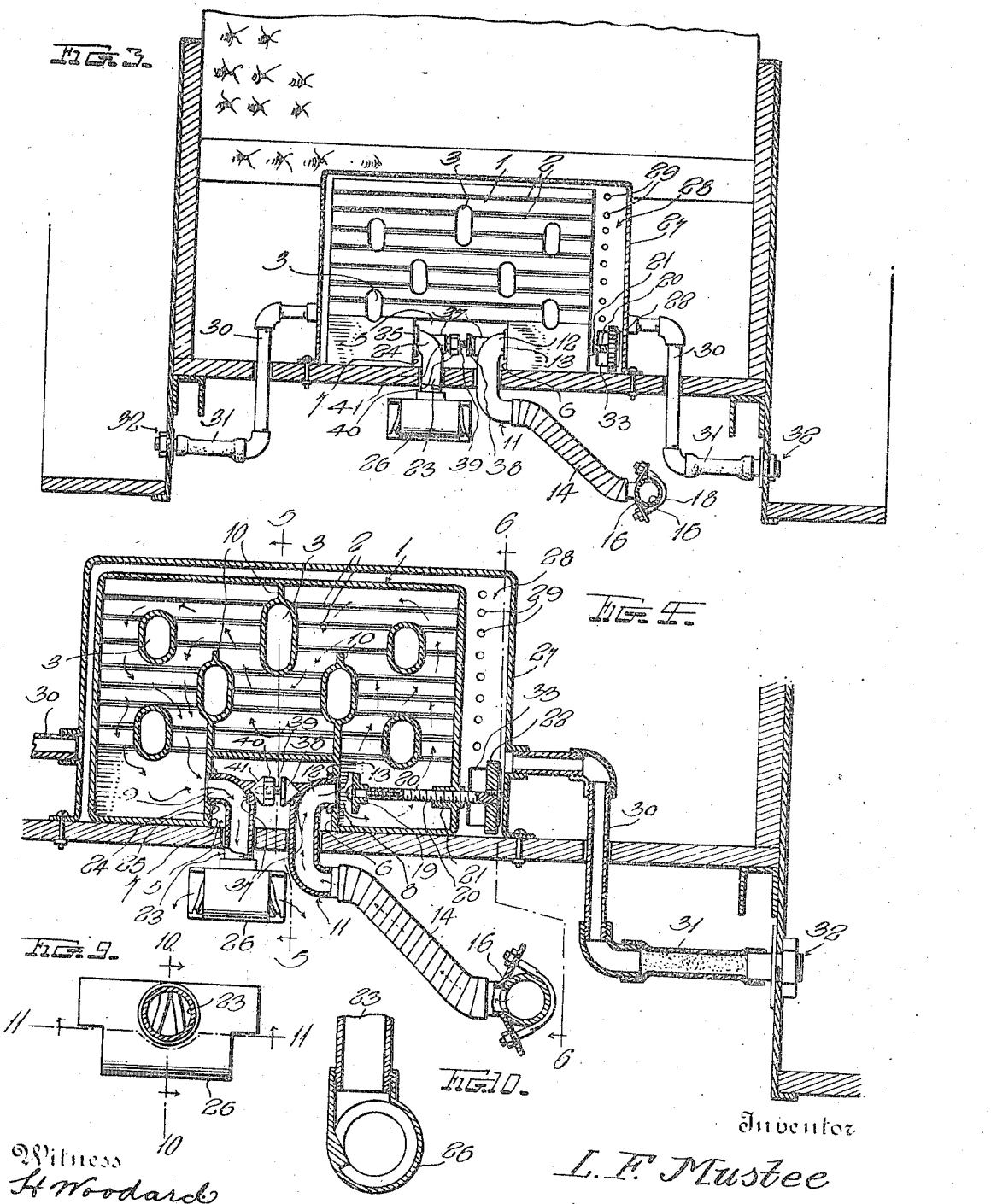

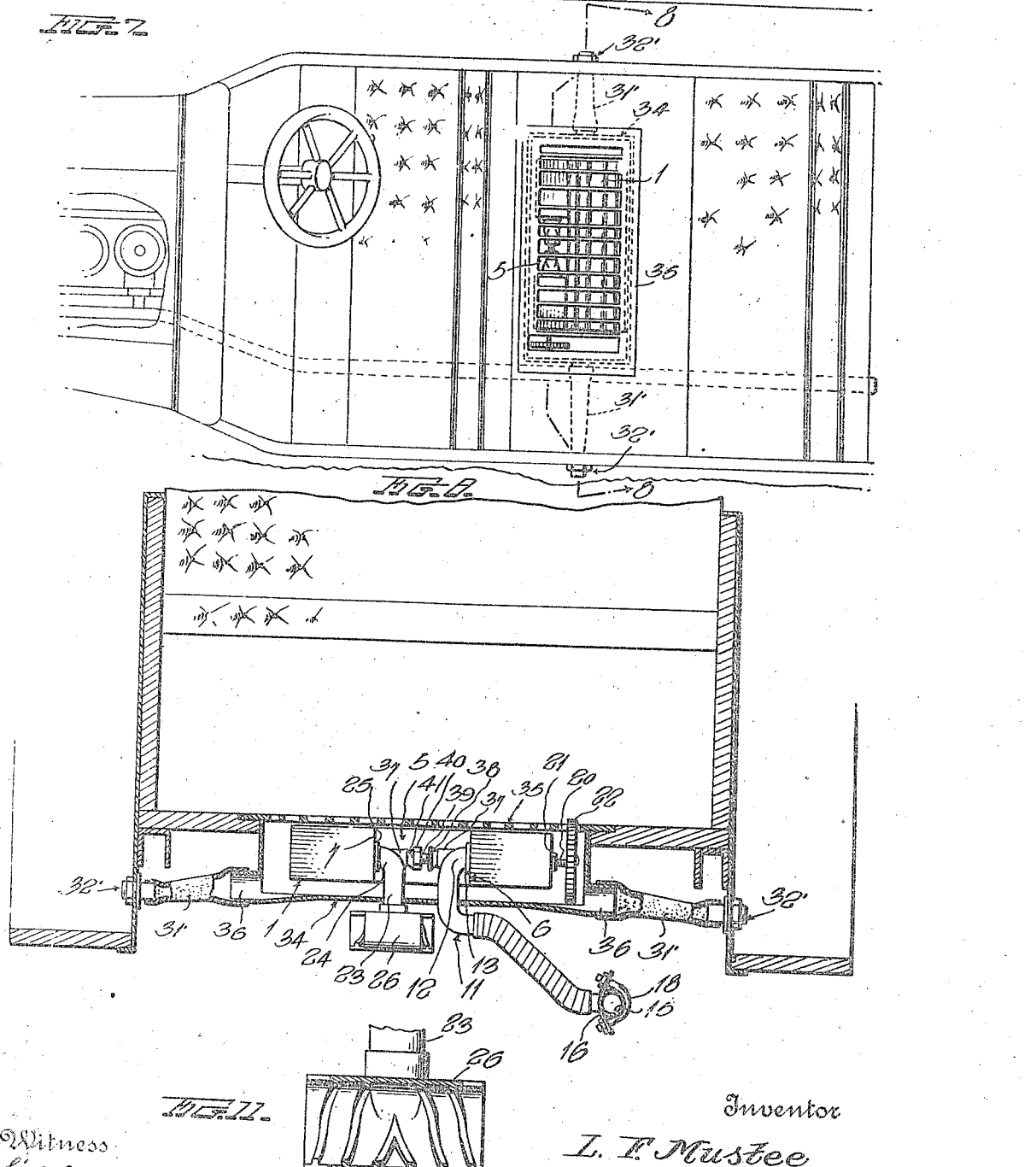

UNITED STATES PATENT OFFICE.

LAWRENCE F. MUSTEE, OF CLEVELAND, OHIO.

HEATING APPARATUS FOR AUTOMOBILES.

1,196,384.

Specification of Letters Patent.

Patented Aug. 29, 1916.

Application filed May 11, 1916. Serial No. 96,889.

*To all whom it may concern:*

Be it known that I, LAWRENCE F. MUSTEE, a citizen of the United States, residing at Cleveland, in the county of Cuyahoga and State of Ohio, have invented certain new and useful Improvements in Heating Apparatus for Automobiles; and I do declare the following to be a full, clear, and exact description of the invention, such as will enable others skilled in the art to which it appertains to make and use the same.

This invention relates to new and useful improvements in heating apparatus for automobiles and other engine driven vehicles and the primary object of the invention is to provide a device of this character which is adapted to utilize the exhaust of an engine for heating the automobile to add to the comfort of the passengers or operator, particularly during winter traveling.

Another object of this invention is to provide a heater of this character, which is applicable to various types of automobiles, by a very simple operation, and owing to the simplified construction of this type of heater the same may be positioned either in the floor of the automobile, or in an upright position behind the front seat of the same.

Another object of the invention is to provide a device of this character which is simple and durable in construction, inexpensive to manufacture, and one which will be very efficient in operation.

With these and numerous other objects in view my invention consists of the novel features of construction, combination and arrangement of parts which will be herein referred to and more particularly pointed out in the specification and claims.

In the accompanying drawings: Figure 1 is a longitudinal section through a portion of an automobile, showing my heating apparatus applied thereto behind the front seat in vertical position; Fig. 2 is a plan view of the same; Fig. 3 is a transverse section on the line 3—3 of Fig. 1; Fig. 4 is a section taken through the heater of the casing that surrounds the same, also showing one of the fresh air inlets to the casing and the exhaust feed to the heater; Fig. 5 is a vertical section on the line 5—5 of Fig. 4; Fig. 6 is a vertical section on the line 6—6 of Fig. 4; Fig. 7 is a plan view of an automobile showing my heater applied thereto in horizontal position; Fig. 8 is a transverse section taken on the line 8—8 of Fig. 7; Fig. 9 is a plan view of the muffler, showing the feed pipe to the same in section; Fig. 10 is a section taken on the line 10—10 of Fig. 9; Fig. 11 is a longitudinal section taken on the line 11—11 of Fig. 9.

In describing my invention I shall refer to the drawings in which similar reference characters designate corresponding parts throughout the several parts, in which Figs. 1 to 6 illustrate the application of this type of heater in an upright position behind the front seat of an automobile while the remaining figures of the drawings illustrate this device applied in the floor of the machine.

The numeral 1 designates an upright hollow casing, which may be formed of any desired material, and which is substantially rectangular in shape and has corrugated sides 2. This hollow casing 1 is provided with a plurality of transversely extending air tubes 3 which project therethrough at spaced intervals, as clearly shown in Figs. 3, 4 and 5 of the drawings.

The casing 1 is provided in one of its edges 4 with a notched portion 5, which has in the opposed faces 6 and 7 of the same an inlet opening 8, and an outlet opening 9 that are positioned substantially in alinement with each other. Through the casing 1 between the corrugated side walls 2 of the same is formed a tortuous passage for the gases which discharge into the same through the inlet 8 and said passage is formed by partitions 10, that project from certain of the air tubes 3, and which are fully illustrated in Fig. 4 of the drawings. By this means the gases will upon entering the casing through the inlet 8 be directed through the tortuous passage formed by the partitions, in such a manner that they will circulate freely within the casing, during the passage therethrough. to the outlet 9, for the purpose of which is obvious in devices of this character.

A substantially U-shaped inlet pipe 11, has its inner end 12 positioned through the inlet 8 of the face 6 of the notch 5 and said end of the pipe is surrounded adjacent the end 12 by a projecting ring 13, which when said pipe is in position is adapted to lie flush against the outer surface of the face 6. This pipe projects from the notch and has its free end 13 connected by a tubular member 14 with the exhaust pipe 15 of the engine for the automobile. The end of the tubular member 14 that is connected with the exhaust pipe is outwardly flared to form a hood 16 which surrounds an opening 17 in said exhaust pipe and is securely positioned thereon by a clip 18.

Positioned within the casing 1 is a valve 19, which is adapted to be positioned over the inlet 8 of the same, and said valve has a stem 20 extending through the adjacent end of the casing as shown at 21, and provided with a wheel 22 on its outer projecting end. The portion of the stem 20 projecting through the wall of the end of the casing is threadedly engaged therewith so that upon the rotation of the wheel 22, the valve 19 will be moved into and out of position over the inlet 8 of said casing. By this means the operation of the heater is controlled, as when the valve is closed, no exhaust gases will be directed through the casing to heat the same and consequently the device will be inoperative. Upon the opening of the valve 19, the gases will be directed through the casing and the heater will be operated.

The outlet opening 9 in the face 7 of the notch is also provided with an outlet pipe 23 which is substantially U-shaped and has one of its ends 24 projecting through the said outlet opening in the wall of the notch. Adjacent the end 24 of the pipe is a projecting ring 25 surrounding the same and adapted when the pipe is in position to engage the outer face 7 of the notch, in a manner similar to the connection employed at the end 12 of the inlet pipe. The outer end of the outlet pipe 23 is connected with a tubular muffler 26, intermediate its ends and said muffler is formed with projecting rotary ribs from the center of the same to its opposite ends, so that the exhaust gases discharged into the same will consequently be sufficiently muffled during the passage therethrough. The last spiral of the rotary internal ribs within the muffler is broken, so that the outlets of the muffler will not be obstructed, and the gases may be easily discharged therefrom.

The outer portions of the inlet pipe 11 and the outlet pipe 23 that are positioned between the opposed faces 6 and 7 of the notch 5, have formed on their outer surface cone-shaped sockets 37, and positioned in one of the sockets 37 is a cone-shaped end 38 of a bolt 39. This bolt is externally threaded and is adapted to be operatively engaged by a nut 40, which has its outer end formed with a cone-shaped head 41 adapted to be positioned within the other cone-shaped socket 37. By this means an expansible and contractible member is adapted to be positioned between the portions of the pipe disposed within the notch so that when the inner ends of the pipe have been inserted in the alining openings 8 and 9 in the opposed faces of said notch, upon the disposition of this member between the pipes, and the engagement of the cone-shaped ends of the same with the cone-shaped notches in the pipes, its expansion will securely drive the ends of the pipe in the openings and will force the rings adjacent said ends against the faces of the notch, thereby securely holding said pipes in position. When it is desired to release the pipes, upon the operation of the nut 40 this member will be contracted, whereby the pressure being relieved from the ends of the pipes, the same may be easily withdrawn from the openings in which they are positioned.

The above described various elements of this type of heater are common to the same when this device is used either in a horizontal position in the floor of the automobile, or whether it is positioned vertically and is disposed behind the front seat of the machine.

In the type of my device illustrated in Figs. 1 to 4 of the drawings and which shows the same in upright position, the casing is surrounded by a jacket 27, which is secured at its bottom to the floor of the car, through which floor openings in which the inlet and outlet pipes may communicate with the casing are positioned. This jacket 27 is provided through its outer side at 28 with a plurality of air outlet openings 29, while projecting laterally from the ends of the same and adjacent the bottom are air inlet pipes 30. These air inlet pipes are connected by flexible tubular members with the running board shields on opposite sides of the automobile and these members which are designated by the numeral 31 project therethrough as shown at 32, so that their outer ends communicate with the atmosphere. By this means fresh air will always be fed through the lower end of the jacket 27, and upon the circulation of the same around the casing 1 and through the air tubes 3 of the same the air will become heated and discharged through the openings 29 in the side of the casing and consequently will bring about the desired degree of warmth. The casing adjacent one of its ends is provided with alining slots 33 in its front and rear walls, through which portions of the periphery of the wheel 22 are adapted to project. The projecting portions of the wheel 22 are roughened, so that the wheel may be rotated when it is desired to operate the valve that controls the inlet to the casing.

When the heater is used in the floor of the automobile, as illustrated in Figs. 7 and 8 of the drawings, I provide for the same a jacket or box 34 which is positioned below the floor of the car and through an opening in the same, and the said box 34 has an open top, over which is secured a perforated floor plate 35 on the floor of the automobile. The box 34 is provided adjacent its opposite ends with air inlet pipes 36 that project therefrom and are connected by flexible tubular members 31' which have their outer ends projecting through the running board shields on opposite sides of the automobile as clearly shown at 32'. This forms a communication between the jacket or box 34 and the atmosphere so that fresh air will be continually fed to the same.

The casing 1 is horizontally positioned within the box or jacket 34, and said box has an opening through its lower side or bottom, through which the inlet and outlet pipes 11 and 23 of the casing are adapted to project. Thus the exhaust gases from the engine may be fed to the casing in a manner hereinbefore more fully described. The wheel 22 that operates the valve that controls the inlet to the casing projects upwardly through the floor plate 35 and has its projecting portions roughened so that the wheel may be rotated when it is desired to operate the valve to control the flow of gases through the casing.

From the above description of the various elements of this heater that are common to the same when the heater is used either in horizontal or upright position, it will be obvious that the heater may be easily and simply applied to any type of automobile. The expansible and contractible member that is positioned between the inner ends of the inlet and outlet pipes that feed the exhaust gases to and carry the same away from the casing, will allow these pipes to be positioned either at right angles to the casing 1 or project therefrom in a single plane with the casing according to the position of the heater. When the heater is positioned behind the front seat of an automobile, the pipes are disposed in a single plane therewith and project from the same through a small opening in the floor of the car. When the heater is positioned below the floor of the automobile, the pipes are positioned at right angles to the casing, so that they will project downwardly through the bottom of the jacket or box in which the casing is disposed. It is only necessary in applying this type to position the jacket or box through an opening in the floor of the car with the heater in same, and to apply the floor plate over the said opening. The type of connection between the air inlets to the jackets that surround the casing is similar in both forms as is clearly illustrated in the accompanying drawings.

From the foregoing description of the construction and operation of this type of heater for motor vehicles the construction and operation of the same will be readily understood and it will be seen that I have provided a simple and efficient means for carrying out the objects of this invention.

The object of the corrugated side walls 2 of the casing 1 is to give a greater space for the air to circulate over, so that the same will be thoroughly heated before it is discharged from the jacket. The passage of the air through the heating device is similar in both types of the device, namely, the said air is fed to the jacket through the inlet passages of the same that communicate with the atmosphere through the running board shields of the automobile and hence around the casing and out through the perforated side wall of the jacket, or if the heater is used in a horizontal position up through the floor plate which forms one side of the jacket or box. The projecting portion of the wheel 22 that operates the valve that controls the inlet to the casing projects through the wall of the jacket or through the floor plate so that the valve will always be within easy reach so that the heater may be quickly shut off or turned on when desired.

I claim:

1. In a heating device for automobiles, the combination with a hollow casing having a notch in one of its edges, the opposed faces of said notch having openings therein, an inlet pipe having one end connected with the exhaust of the automobile and the other positioned in one of said openings, an outlet pipe with one end positioned in the other opening and having a muffler secured to its other end, and an expansible and contractible locking member disposed between said pipes to releasably secure the ends of the pipes positioned in the notch in locked relation with the openings.

2. In a heating device for automobiles, the combination with a hollow casing having a notch in one of its edges, the opposed faces of said notch having openings therein, an inlet pipe having one end connected with the exhaust of the automobile and the other positioned in one of said openings, an outlet pipe with one end positioned in the other opening and having a muffler secured to its other end, an expansible and contractible locking member disposed between said pipes to releasably secure the ends of the pipes positioned in the notch in locked relation, and a jacket surrounding the casing whereby air passing through the same is heated by contact with the casing.

3. In a heating device for automobiles, the combination with a hollow casing having a notch in one of its edges, the opposed faces of said notch having openings therein, an inlet pipe having one end connected with the exhaust of the automobile and the other positioned in one of said openings, an outlet pipe with one end positioned in the other opening and having a muffler secured to its other end, an expansible and contractible locking member disposed between said pipes to releasably secure the ends of the pipes positioned in the notch in locked relation, a jacket surrounding the casing, air inlets for the same communicating with the atmosphere through the running board shields of the automobile, and outlets through one side of said jacket.

4. In a heating device for automobiles the combination with a hollow casing having a notch in one of its edges, the opposed faces of said notch having openings therein, an inlet pipe having one end connected with the exhaust of the automobile, the opposite end of said pipe positioned in one of said openings, a ring surrounding said pipe adjacent the end engaging the face of said notch when the pipe is in position, a valve in said casing for controlling the inlet, operating means for said valve projecting through one end of the casing, an outlet pipe with one end positioned in the opening in the opposed face of said notch, a ring surrounding said end of the pipe adjacent said end adapted to engage the face of the notch when the pipe is in position, a muffler on the other end of said outlet pipe, and an expansible and contractible screw member disposed between said pipes to releasably secure the same in position.

5. In a heating device for automobiles, the combination with a hollow casing having a notch in one of its edges, the opposed faces of said notch having an opening therein, an inlet pipe having one end connected with the exhaust of the automobile and the other positioned in one of said openings, an outlet pipe with one end positioned in the opening in the opposed face of the notch and having a muffler secured to its other end, cone-shaped sockets on the opposed faces of the portions of said pipes positioned in the notch, a screw with a cone-shaped head adapted to be positioned in one of said sockets, and a nut operatively connected with said screw having a cone-shaped outer end adapted to be positioned in the opposite socket.

6. In a heating device for automobiles the combination with a hollow casing, said casing having a notch in one of its edges, inlet and outlet pipes positioned through the opposed faces of said notch, an extensible and contractible member to lock said pipes in position, a connection between the inlet pipe and exhaust of the automobile, a muffler for the free end of said outlet pipe, a jacket surrounding the said casing, air inlets through the opposite sides of the same, flexible tubular members connecting the inlets with the atmosphere through the running board shields of the automobile, and air outlets through one side of said jacket.

7. In a heating device for automobiles the combination with a hollow casing having corrugated opposite sides, transversely extending air tubes through the same, a notch in one edge of said casing, inlet and outlet pipes positioned through the opposed faces of said notch and projecting from the casing, a valve in said casing for the inlet, a tortuous passage in said casing from the inlet to the outlet of the same, said inlet pipe communicating with the exhaust of the automobile, a muffler for said outlet pipe, and a jacket surrounding the casing and provided with air inlets and outlets.

In testimony whereof I have hereunto set my hand in presence of two subscribing witnesses.

LAWRENCE F. MUSTEE.

Witnesses:
H. C. MORRIS,
G. G. BABBITT.